Aug. 23, 1949.  W. PFERSICK  2,479,963
SHEAVE ALIGNING APPARATUS
Filed Sept. 4, 1948
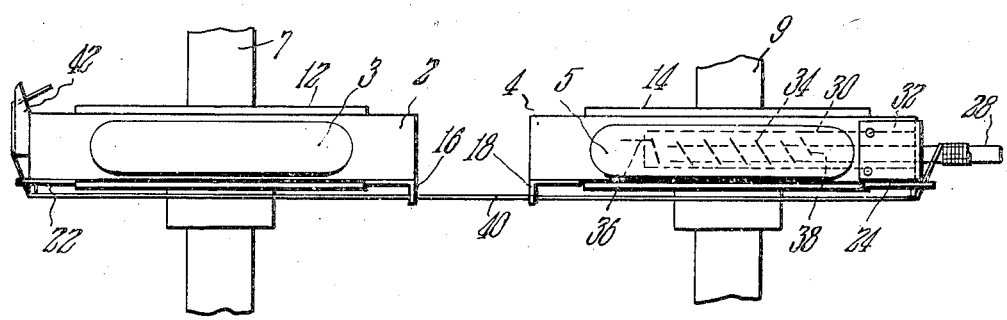
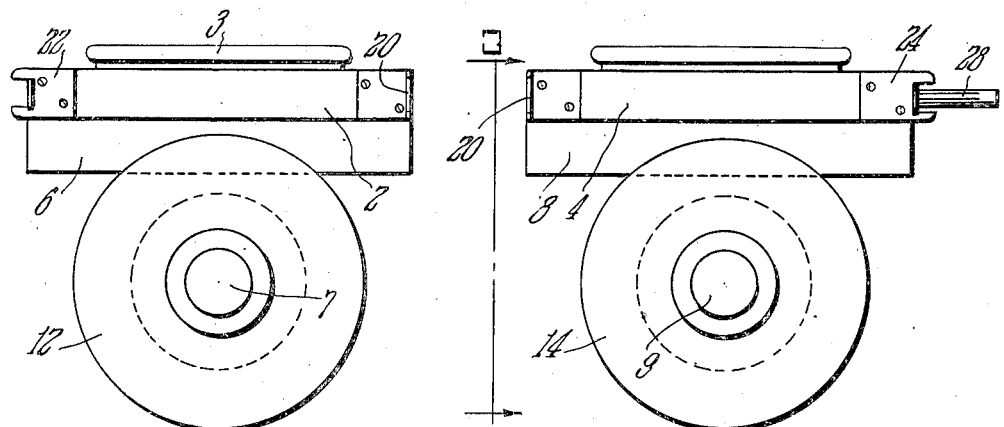
INVENTOR.
Winfred Pfersick.
BY Ross & Ross
Attys.

Patented Aug. 23, 1949

2,479,963

UNITED STATES PATENT OFFICE 2,479,963

SHEAVE ALIGNING APPARATUS

Winfred Pfersick, Feeding Hills, Mass.

Application September 4, 1948, Serial No. 47,830

2 Claims. (Cl. 33—86)

This invention relates to improvements in apparatus for aligning sheave wheels and shafts thereof.

The principal objects of the invention are directed to the provision of novel apparatus for aligning sheave wheels and shafts thereof so that the grooves of the wheels are in parallel alignment and the wheel shafts are in parallelism.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Figs. 1 and 2 are plan and side elevational views of the aligning apparatus of the invention.

Fig. 3 is an end view on the line 3—3 of Fig. 2.

Fig. 4 is an end view of one of the aligning members and

Fig. 5 is a similar view of the end of the other aligning member.

Referring now to the drawings more in detail, the invention will be fully described.

A pair of elongated aligning members 2 and 4 are provided which have lower converging sides, as shown in Figs. 3, 4 and 5, forming tongues 6 and 8. The angularity of the sides of the tongues will be complemental to the sides of the V groove 10 of sheave wheels 12 and 14 which are mounted on shafts 7 and 9, respectively.

Inner ends of the members 2 and 4 have secured thereto plates 16 and 18. These plates have line seats such as 20, as shown in Fig. 3.

Plates 22 and 24 are secured to outer ends of the members 2 and 4 and these are provided with line seats such as 26, see Fig. 4.

The line seats of the plates 16, 18, 22 and 24 are so arranged that they are in aligned planes when the members 2 and 4 are disposed in the grooves of sheave wheels which are in alignment and the shafts thereof are in parallelism.

A shaft 28 extends a bore 30 provided in the member 4 and is rotatable in an end plate 32 secured to the end of said member. A spring 34 around said shaft 28 has one end 36 anchored in the bottom of the bore and its opposite end 38 anchored to shaft 28.

The spring 34 is arranged to rotate the shaft 28 in one direction or said shaft is rotated in an opposite direction against the action of said spring.

A line cord 40 is provided which has one end secured to the shaft 28 and is secured thereto. A retainer 42 is secured to the outer end of the member which is provided with a notch 44 for engaging the line cord.

The members 2 and 4 are placed in the grooves of the sheave with the line cord extending from the retainer to the shaft 28 and past the line seats.

The sheaves and their shafts may be different distances apart and the line cord is arranged to exert a strain on the spring 34 so as to be taut.

When the grooves of the sheaves are in alignment the line cord will touch and bear the four seats of the members 2 and 4. Should the grooves be out of alignment the line seats of one of the members will cause the line to be spaced from inner line seat of the other member. The sheaves may be aligned by moving one or the other along its shafts until the line bears on all of the seats.

If the shafts are not in parallelism the line cord will not bear on all the seats and the shafts may be adjusted so that the line does bear on all of the seats.

The line 40 may be of any material and the members 2 and 4 may be provided with manually engageable handles 3 and 5.

Spirit levels may be applied to the members 2 and 4 whereby it may be determined whether the members are level.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Apparatus for aligning sheave wheels having V grooves comprising in combination, separate elongated aligning members each having converging opposite longitudinal sides adapted to be received in the V grooves of sheave wheels, seats on opposite ends of said members, and means at opposite ends of said members adapted for the attachment of a line to extend across said seats when said members are disposed in aligned position.

2. Apparatus for aligning wheels having circumferential V grooves comprising in combination, separate elongated members each having elongated lower sides which converge downwardly in the form of a V for resting in the V of a wheel, seats at opposite ends of said members for a line extended thereacross, means at the outer end of one of said members adapted for securement of a line thereto, and means at the outer end of the other of said members for tensioning a line including a shaft on which a line may be served and a spring resisting rotation of said line in one direction.

WINFRED PFERSICK.

No references cited.